Patented Feb. 5, 1952

2,584,139

UNITED STATES PATENT OFFICE 2,584,139

DIELS-ALDER ADDUCTS OF HEXAHALO-CYCLOPENTADIENE WITH QUINONES

Rex E. Lidov, Julius Hyman, and Edward Segel, Denver, Colo.; said Lidov and said Segel assignors to Velsicol Corporation, Chicago, Ill., a corporation of Illinois No Drawing. Application December 27, 1947, Serial No. 794,204

16 Claims. (Cl. 260—586)

This invention relates to new compositions of matter and to methods of preparation of said compounds.

The compounds which are the subject of this invention are useful as fungicides, bactericides, insecticides, and are further useful as intermediates to produce other valuable materials which may have a diversity of uses.

More specifically, this invention is concerned with the reaction of hexahalocyclopentadiene such as hexachlorocyclopentadiene, hexabromocyclopentadiene, or a hexa-chlorobromocyclopentadiene, with quinone such as benzoquinone, naphthoquinone, phenylbenzoquinone, p-thymoquinone, 2,6-dimethyl-1,4-benzoquinone, 2,6-dimethyl-1,4-naphthoquinone, chlorobenzoquinone, 2,3-dichlorobenzoquinone, etc. and with quinone adducts such as the butadiene adduct of benzoquinone, the isoprene adduct of benzoquinone, etc.

The reaction herein involved is thought to be a Diels-Alder reaction and may be represented by the following reaction of benzoquinone with hexachlorocyclopentadiene as exemplary of the general reaction herein disclosed.

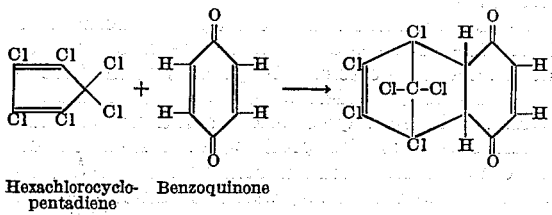

Hexachlorocyclo-  Benzoquinone
pentadiene

Similarly, and again in an exemplary fashion, hexabromocyclopentadiene will react with naphthoquinone in the following manner.

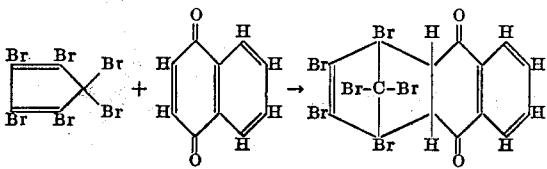

Hexabromocyclo-  Napthoquinone
pentadiene

The process of this invention is carried out either with or without solvent and at somewhat elevated temperatures in the range of about 90° C.–225° C. and preferably in the range of about 130° C.–170° C. The time required for the reaction is naturally dependent at least partially on the temperature utilized and partially on whether or not a solvent is utilized, and said time may vary from just a few minutes to several hours.

The hexachlorocyclopentadiene utilized in the process of this invention may be prepared by any desired method and may be satisfactorily prepared by the following procedure:

To 15 liters of approximately 2 molar sodium hypochlorite solution (cooled to about 10° C.), which is also approximately 0.5 molar with respect to excess sodium hydroxide, is added in one operation an emulsion of 376 grams (5.7 moles) freshly distilled cyclopentadiene in 400 ml. water containing 0.2% of 50% technical sodium lauryl sulfate as the emulsifying agent, vigorous mechanical stirring being maintained all the while. No external cooling is required to control the moderately exothermic reaction, the temperature of the reaction mixture reaching a peak of about 45° C. The reaction mixture consists of two phases, an aqueous phase and a non-aqueous phase. Adequate agitation is therefore required to provide intimate contact between the two phases, the agitation is continued for a total of two hours after the addition of the cyclopentadiene emulsion. After the stirring has been discontinued, the reaction mixture is allowed to stand long enough to effect a good separation of the aqueous and non-aqueous layer. The non-aqueous layer which contains the hexachlorocyclopentadiene is drawn off and dried over magnesium sulfate. This crude liquid is purified by fractionation through an insulated eight inch Hempel column packed with Berlsaddles; hexachlorocyclopentadiene is collected at a boiling range of 58° C.–64° C. at 1.3 to 1.5 mm. mercury. The once fractionated hexachlorocyclopentadiene thus obtained is carefully refractionated using a "Todd" fractionating assembly and the fraction boiling between 60°–62° C. at 1.4 mm. mercury is collected for use.

Analogously, hexabromocyclopentadiene may be prepared by reacting cyclopentadiene with sodium hypobromite. Hexabromocyclopentadiene reacts with quinones although not quite as readily as does hexachlorocyclopentadiene.

One of the hexa-hetero-halocyclopentadienes, which may be used as a generator for the new compositions of matter hereindisclosed, can be prepared as follows:

A solution of 21.1 grams (0.32 mol) of cyclopentadiene, dissolved in 63 ml. of hexane, is added at one time to a vigorously stirred, mixed solution of sodium hypobromite and sodium hypochlorite maintained at 35° C. (The hypohalite solution consists of 0.64 mole of sodium hypobromite and 1.92 moles of sodium hypochlorite prepared from 2.0 molar solutions of each of the components; it contains an excess of alkali corresponding to 0.5 molar sodium hydroxide.) The temperature after the addition of cyclopentadiene rises rapidly to 45° C. and is then maintained at 40° C.–45° C. for one hour. At the end of this time, agitation is discontinued and the heavy organic phase is separated, after the addition of approximately 1½ volumes (based on the non-aqueous phase) of hexane to insure good separation from the aqueous phase. After decolorization of the separated organic phase with a decolorizing carbon, the hexane is removed in vacuo. There results 106 grams of crude chloropentabromocyclopentadiene which may be purified by conventional means.

The quinones and quinone adducts which are utilized in this invention may be obtained from commercial sources or prepared according to methods well known in the art. The quinone adducts may also be obtained by the processes herein described.

EXAMPLE I

*Reaction of hexachlorocyclopentadiene with benzoquinone (without solvent)*

Hexachlorocyclopentadiene (214 grams) was placed in a flask with 82.6 grams benzoquinone and heated slowly to a temperature of about 130° C.–160° C. and maintained in that temperature range for about fifteen minutes. The hot mixture was then poured into a chilled beaker and the reaction mixture, after a few minutes, was quenched with hexane. Multiple recrystallizations from a benzene-hexane mixture resulted in a yield of a yellow crystalline material melting at 184° C.

|  | Per cent C | Per cent H | Per cent Cl |
|---|---|---|---|
| Calculated for Diels-Alder addition product | 34.53 | 1.05 | 55.85 |
| Found for Product of above Example | 34.71 | 1.07 | 55.60 |

Thus, the product is the expected adduct of hexachlorocyclopentadiene and benzoquinone.

EXAMPLE II

*Reaction of hexachlorocyclopentadiene with benzoquinone (utilizing a solvent)*

Benzoquinone (54 grams) was dissolved in 625 ml. xylene and brought to reflux temperature. Hexachlorocyclopentadiene (133 grams) was added over a forty minute period and refluxing was continued for about fifteen minutes. Solvent was removed from the reaction mixture by distillation and the residue was recrystallized from a benzene-hexane mixture resulting in a yellow crystalline material melting at 183° C.–186° C. A mixture of this product with the product of Example I melted without showing depression of the melting point of the mixture from that of its components and, therefore, the product is the mono-adduct of hexachlorocyclopentadiene and benzoquinone.

EXAMPLE III

*Reaction of hexachlorocyclopentadiene and toluquinone*

Toluquinone (1.2 grams) was heated with hexachlorocyclopentadiene (2.7 grams) at 130° C. for thirty minutes. On cooling, the solid mass was triturated with hexane and filtered. The solid light tan powder, thus obtained, melted at 163° C.–166° C. and weighed 3.4 grams. The crude product was decolorized with charcoal in a hexane-benzene mixture, and recrystallized to yield 1.8 grams crystalline solid melting at 168° C.–170° C.

*Analysis.*—Carbon, 37.02%; hydrogen, 1.72%; chlorine, 53.90%. Calculated for $C_{11}H_6Cl_6O_2$, carbon 36.50%; hydrogen, 1.52%; chlorine, 53.86%.

Thus, the product is the expected adduct of hexachlorocyclopentadiene and toluquinone.

EXAMPLE IV

*Reaction of hexachlorocyclopentadiene with naphthoquinone*

Naphthoquinone (8.9 grams) was heated at 130° C. for four hours intermixed with hexachlorocyclopentadiene (15.6 grams). The reaction mixture was poured into a beaker and the material was triturated with hexane, cooled and filtered. The solid was dissolved in hexane-benzene treated with charcoal and subsequently recrystallized from hexa-benzene mixture. The thus purified product weighed 13 grams and melted at 118° C.–120° C.

|  | Per cent C | Per cent H | Per cent Cl |
|---|---|---|---|
| Theoretical for Adduct of Hexachlorocyclopentadiene+Naphthoquinone | 41.81 | 1.40 | 49.37 |
| Analysis of Product | 42.23 | 1.79 | 49.05 |

Thus the product is the Diels-Alder adduct of hexachlorocyclopentadiene and naphthoquinone.

EXAMPLE V

*Reaction of hexachlorocyclopentadiene with phenyl benzoquinone*

Phenyl benzoquinone (5.4 grams) and hexachlorocyclopentadiene (8.1 grams) were intermixed and heated at 130° C. for two hours. The mixture was then poured into hexane, filtered, treated with charcoal and subsequently recrystallized from hexane-benzene mixture. The thus obtained adduct melted at 167° C.–169° C.

It is understood the examples hereinbefore listed are not intended to limit the invention but are included to disclose the process of the invention in a more understandable manner. Necessarily, all techniques and variations for the manufacture of the products of this invention have not been included and various modifications thereof will be suggested to those skilled in the art.

Generally, the process herein concerned can be represented by the reaction:

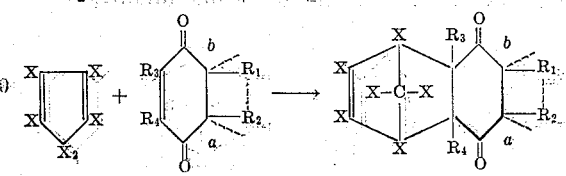

Where X is either chlorine or bromine; $R_1$ and $R_2$ are either hydrogen atoms, halogen atoms, or any organic radicals of an aliphatic, alicyclic, or aromatic nature which may or may not have a common bond as represented by the dotted line; $a$ and $b$ are bonds joined in general to each other but capable, when $R_1$ and $R_2$ are organic radicals having a common bond as represented by the dotted line, of being joined to hydrogen atoms, halogen atoms, or organic radicals as defined above and $R_3$ and $R_4$ are either hydrogen atoms, halogen atoms or organic radicals as defined above. More simply and concisely, the general reaction can be stated as a Diels-Alder type synthesis in which a hexahalocyclopentadiene acts as the diene and a "quinoid" compound acts as a dienophile. A "quinoid" compound is here defined as one having two ketonic oxygen atoms and at least one double bond conjugated with at least one of the ketonic oxygens in a cyclohexane ring. As the term is here defined, 1,4-benzoquinone, 1,2-benzoquinone, 3-chloro-1,2-naphthoquinone, the butadiene adduct of 1,4-benzoquinone, the hexachlorocyclopentadiene adduct of 1,4-benzoquinone, etc. are all typical examples of "quinoid" compounds.

The reaction will not proceed with equal facility in each specific instance and, consequently, the reaction conditions must be varied within the limits hereinbefore listed.

The adducts of quinones with hexahalocyclopentadienes have been found to be very useful in the control of insects such as the common housefly, the German and American cockroach, mosquito larvae, adult squash bug, Colorado potato beetle and various other insects. Many different types of bacteria and fungi may also be controlled by use of the aforementioned adducts.

The new insecticidal compounds of this invention may be utilized in the form of oil sprays, dusts, aqueous emulsions, aerosols, etc., either alone or in association with any other desired toxicants, in preparations and by methods of application known to the art.

We claim as our invention:

1. A new composition of matter comprising the Diels-Alder adduct of a hexahalocyclopentadiene wherein the halogen substituents are of the group consisting of chlorine, bromine and mixtures thereof, as the diene, and a quinone compound of the group consisting of benzoquinones and napthoquinones, as the dienophile.

2. A new composition of matter comprising the Diels-Alder adduct of a hexahalocyclopentadiene, as a diene, and a quinone as a dienophile, having the general formula

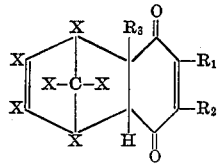

wherein X is a halogen chosen from the group chlorine and bromine; and $R_1$, $R_2$ and $R_3$ are chosen from the group hydrogen, halogen and hydrocarbon radicals.

3. A new composition of matter comprising the Diels-Alder adduct of a hexahalocyclopentadiene, as a diene, and a quinone, as a dienophile, having the general formula

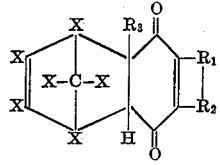

wherein X is a halogen chosen from the group chlorine and bromine; $R_1$ and $R_2$ are hydrocarbon radicals and $R_3$ is chosen from the group hydrogen, halogen and hydrocarbon radicals.

4. A composition of matter comprising the Diels-Alder adduct of a hexahalocyclopentadiene, as the diene, and a Diels-Alder type quinone adduct, as the dienophile, having the general formula

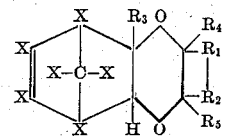

wherein $R_1$ and $R_2$ are hydrocarbon radicals and are derived from a diene reacting with a benzoquinone in the Diels-Alder reaction, $R_3$, $R_4$, and $R_5$ are chosen from the group hydrogen, halogen and hydrocarbon radicals and wherein X is of the group consisting of chlorine, bromine and mixtures thereof.

5. A composition according to claim 1 wherein the hexahalocyclopentadiene is hexachlorocyclopentadiene.

6. A composition according to claim 1 wherein the quinone compound is benzoquinone.

7. The method of forming the addition reaction product of a hexahalocyclopentadiene wherein the halogen substituents are of the group consisting of chlorine, bromine and mixtures thereof and a quinone of the group consisting of benzoquinones and naphthoquinones which comprises reacting a mixture of said constitutents at a temperature of about 90° C.–225° C.

8. The method of forming the addition reaction product of hexachlorocyclopentadiene and a quinone of the group consisting of benzoquinones and naphthoquinones which comprises reacting said constituents at a temperature of about 130° C.–170° C.

9. The method of forming the Diels-Alder addition reaction product of hexachlorocyclopentadiene and benzoquinone which comprises reacting said constituents at a temperature of about 130° C.–170° C.

10. The compound represented by the formula

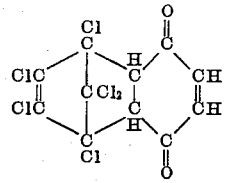

11. The method of forming a new composition of matter which comprises subjecting to Diels-Alder reaction a hexahalocyclopentadiene, wherein the halogen substituents are of the group consisting of chlorine, bromine and mixtures thereof, and a quinone of the group consisting of benzoquinones and naphthoquinones, to form an adduct of said reactants.

12. The Diels-Alder adduct of a hexahalocyclopentadiene and a quinone compound of the group consisting of benzoquinones and naphthoquinones, said adduct having the general formula

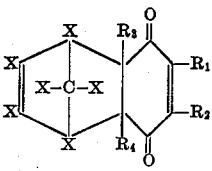

wherein the letters X represent halogen atoms of the group consisting of chlorine and bromine, and $R_1$, $R_2$, $R_3$ and $R_4$ are selected from the group consisting of hydrogen, halogen and hydrocarbon radicals.

13. A new composition of matter comprising the Diels-Alder adduct of hexachlorocyclopentadiene and naphthoquinone.

14. A new composition of matter comprising the Diels-Alder adduct of hexachlorocyclopentadiene and 2,6-dimethyl-1,4-naphthoquinone.

15. A new composition of matter comprising the Diels-Alder adduct of hexachlorocyclopentadiene and chlorobenzoquinone.

16. A new composition of matter comprising the Diels-Alder adduct of hexachlorocyclopentadiene and 2,3-dichlorobenzoquinone.

REX E. LIDOV.
JULIUS HYMAN.
EDWARD SEGEL.

REFERENCES CITED

The following references are of record in the file of this patent:

Prill: J. Am. Chem. Soc., vol. 69, pages 62–63, (1947).